United States Patent [19]

Schwing et al.

[11] Patent Number: 4,951,806

[45] Date of Patent: Aug. 28, 1990

[54] DOUBLE BELT CONVEYOR BAND

[75] Inventors: Friedrich W. Schwing; Gerhard Schwing, both of Herne, Fed. Rep. of Germany

[73] Assignee: Friedrich Wilh. Schwing GmbH, Herne, Fed. Rep. of Germany

[21] Appl. No.: 57,499

[22] Filed: Jun. 3, 1987

[30] Foreign Application Priority Data

Jul. 6, 1986 [DE] Fed. Rep. of Germany ....... 3619246

[51] Int. Cl.$^5$ .............................................. B65G 15/14
[52] U.S. Cl. .................................... 198/605; 198/715;
198/847; 198/626.3
[58] Field of Search ................................ 198/626–628,
198/604, 605, 715, 847, 713

[56] References Cited

U.S. PATENT DOCUMENTS

| 2,670,837 | 3/1954 | Hansen | 198/713 |
|---|---|---|---|
| 3,319,776 | 5/1967 | Bechtloff et al. | 198/628 |
| 3,429,420 | 2/1969 | Bechtloff et al. | 198/628 |
| 3,446,332 | 5/1969 | Bechtloff | 198/626 |
| 3,603,448 | 9/1971 | Okano et al. | 198/628 |
| 3,618,746 | 11/1971 | Suloff | 198/628 |
| 3,690,444 | 9/1972 | Chassang | 198/626 |
| 3,880,274 | 4/1975 | Bechtloff et al. | 198/626 |
| 3,882,995 | 5/1975 | Uraya | 198/628 |
| 3,910,405 | 10/1975 | Couperas et al. | 198/628 |
| 3,982,626 | 9/1976 | Mehta | 198/626 |
| 4,195,724 | 4/1980 | Janitsch | 198/626 |
| 4,273,238 | 6/1981 | Blättermann et al. | 198/626 X |
| 4,585,118 | 4/1986 | Plaut | 198/626 X |
| 4,666,032 | 5/1987 | Gough | 198/626 |

FOREIGN PATENT DOCUMENTS

| 0009764 | 4/1980 | European Pat. Off. | |
| 936918 | 11/1955 | Fed. Rep. of Germany | 198/626 |
| 948857 | 9/1956 | Fed. Rep. of Germany | |
| 1012865 | 7/1957 | Fed. Rep. of Germany | |
| 1140506 | 11/1962 | Fed. Rep. of Germany | |
| 3432553 | 3/1986 | Fed. Rep. of Germany | |
| 3440150 | 5/1986 | Fed. Rep. of Germany | |
| 1380653 | 7/1968 | France | 198/626 |
| 35870 | 8/1954 | Poland | 198/626 |
| 473029 | 7/1969 | Switzerland | 198/626 |
| 0619394 | 8/1978 | U.S.S.R. | 198/626 |

Primary Examiner—Joseph E. Valenza
Assistant Examiner—D. Glenn Dayoan
Attorney, Agent, or Firm—Reese Taylor

[57] ABSTRACT

A double-belt conveyor band with a continuously revolving conveyor band, the belt of which is supported on a band feeder and in connection with a steep segment on trough roller assemblies, and is supported flatly on the steep segment, as well as with a continuously revolving covering band. The belt is buckled in the conveyor seam for the formation of closed conveyor spaces, preferably between traction reinforcements positioned externally, the shear-resistant lateral reinforcements acting in cooperation therewith. The belt ends are pressed on one another and the longitudinal edges of the belt are held together. It is provided in accordance with the invention that, in order to hold together the belts on both longitudinal edges of the cover band, fasteners projecting externally are provided with opposing apertures to which the longitudinal edges of the conveyor belt, during the running of the trough roller assemblies, approach or move away from during the running of the conveyor belt. At least one band support roller or band guide roller is installed downstream of the last trough roller assembly and flattens and supports the conveyor belt and which further engages with the hooks via its longitudinal edges for pressing the belt edges on one another, as well as for reciprocal holding together of the belts.

13 Claims, 3 Drawing Sheets

DOUBLE BELT CONVEYOR BAND

RELATED PATENT APPLICATIONS

This application claims priority under 35 U.S.C. 119 based on Federal Republic of Germany Application P36 19 246.5, filed June 7, 1986.

BACKGROUND OF THE INVENTION

The invention concerns, in general, conveyor belts and, in particular, double belt bands.

SUMMARY OF THE INVENTION

The double belt band conveyor in accordance with the invention serves to overcome inclined, preferably vertical, conveying paths, the angles of which thus exceed the slide angle of a rolling material being conveyed on the conveyor band belt, or a fluid or viscous material being conveyed, such as, for example, mortar or concrete, which would thus be made to spill on the steep segment. The covering band cooperates with the conveying seam of the conveying belt in such a way that, through the buckling of the covering band belt between the seams of the belts which cover one another, conveyor spaces which are closed externally are formed, which enclose the material being conveyed so that the conveying effect arises. By this means, it is ensured through the pressing onto one another of the belt edges, and through the cohesion of the longitudinal edges of the belt, that the conveyor spaces remain sealed, so that significant portions of the material being conveyed cannot be forced out. If, in accordance with the preferable forms of the invention, a traction reinforcement and lateral reinforcement of the conveyor band belt are provided, then conveyor spaces sealed externally as well against one another result which are also thoroughly water-tight.

The formation of the conveyor spaces through the buckling of the conveyor band belt has the advantage that, in order to guide and, if necessary, support the conveyor band belt, straight band bearing rollers and band guiding rollers can be provided, since the buckled areas of the belt, depending on the support side, can also, for example, be buckled in the reverse direction. Such straight band bearing rollers and guide rollers can thus, at any rate, at least, be used with the exception of the lower loop which is connected with the band feeder. At that point, at most, only one depressed band guide roller is necessary, which accommodates the bucklings, and deflects the belt seams which cooperate with one another into the vertical. Band bearing rollers are, on the other hand, used on the upper loop of the conveyor band for the deflection of the belt into the horizontal where the belts separate from one another so that, at that point, no consideration needs to be given to the buckling. If the steep segment, as is generally provided, runs essentially vertically, then the belts generally need no support, or only slight support, but it must be ensured that the described cohesion of the belts is guaranteed.

Double belt band conveyors of the type in accordance with the invention can replace chain bucket conveyors, and improve the conveying of such considerably, since they make do with fewer individual parts, have a significantly lower need for spare parts, and convey more uniformly. The double belt band conveyor in accordance with the invention thus has the advantage that it works with essentially smooth band surfaces, and is nonetheless not subject to bridge formation of the material being conveyed for the formation of the conveying spaces.

The invention presupposes such a type of double belt band conveyor as is already known (DE-OS 34 32 553). In this, on the steep segment, stationary guide strips with U-shaped sections serve to press the edges of the belt on one another, and to hold the edges of the belt together. These guide strips are straight, and presuppose that the running belts already lie on another with their longitudinal edges. Therefore, by means of corresponding prestressing of the band, the separating forces of the belt must be opposed before the running in of the guide strips.

The longitudinal edges of the belt are not only held onto one another in the guide strips, but are also moved in the direction of conveyance. This presupposes a corresponding movement clearance which, because of the cohesion required, must not be selected either too large or too narrow, since the frictional forces of the longitudinal edges of the belt in the guide thereby rise which must be surmounted by the belts.

The advantages of the known double belt band conveyor are connected with this. On the one hand, the energy requirement of the band drives is correspondingly high and the wear on the longitudinal edges of the band is already noticeable after brief operational times, so that the belts need to be changed frequently. On the other hand, the conveyor spaces are not reliably sealed. This leads to energy losses between the conveyor spaces through portions of the material being conveyed, which move against the direction of conveying and, on the edges of the band, lead to contamination from the material being conveyed which impairs the guidance so that, finally, the belts threaten to slide off on the steep segment.

The task which forms the basis of the invention is that of easing the driving of the double belt band conveyor which is presumed to be known and relieving its belt, as well as thoroughly preventing disturbances of operation.

This task is solved by means of the characteristics in accordance with the invention. Suitable forms of execution of the invention are the object of the invention.

In accordance with the invention, the fasteners projecting externally on the edges of the covering band replace the guide strips through which the pressing against one another of the belt edges, and the cohesion of the longitudinal edges of the belt, are guaranteed by the reciprocal cohesion so that a stationary guide can be dispensed with. Through this, the previous losses from friction are eliminated. The engaging and disengaging of the conveyor belt edges in these devices which ensure the pressing together and holding together takes place, in accordance with the invention, through the use of the elastic change of form of the conveyor band belt which moves this on its path from the band reversal into the steep segment, and from this up to the point of release. These changes of form take place in connection with the trough roller assemblies, since the belt is then moved from trough curve into the trough cord and is thereby increasingly flattened. This leads, in accordance with the invention, to the conveyor belt edges first approaching the apertures of the fasteners, and finally engaging the longitudinal edges of the belt with the fasteners. A force-locking cohesion of the edges of the belt is then ensured which produces sufficiently great counterforces for the belts which tend to move towards one another and hold the conveyor spaces tightly.

This takes place without notable levels of frictional wear and tear, but does ensure an adequate sealing so that energy losses and disturbances of operation are thoroughly prevented. If, at the end of the steep segment, a renewed depression of the conveyor belt arises, then the longitudinal edges of the same disengage from contact with the fastener through the lateral contraction which is based on the curvature of the belt on the trough roller assemblies, whereby even considerable frictional forces of the longitudinal edges of the belt on the fasteners can be overcome so that an orderly run of the band is ensured.

An uninterrupted hold is preferably ensured, since the fasteners are combined to a strip. This can be realized comparatively simply with the production of the belt, since the edges of the belt blank are correspondingly permanently shaped, or the strips are vulcanized. The strip profile is angular so that, with the vertical blade, consideration can be given to the vertical dimensions of the longitudinal edges of the belt, while the blade running parallel to the flat belt receives an adequate width in order to support the belt on an adequate surface.

The bend resistance of the fasteners or the strips connecting them should be adequately large to avoid elastic deformations of the fasteners which could release the longitudinal edges of the belt which have been clasped. Extended lateral reinforcements serve this purpose which simplifies the overall construction.

The engaging and disengaging of the longitudinal edges of the belt in the apertures of the fasteners should take place as free from jerking as possible. The bevellings of the fastener blades and the bevelled conveyor belt edges which cooperate with them act in harmony with one another in such a way that, upon engaging, guide surfaces result which make possible the pressing onto one another of the edges of the belt with increasing force.

A particular support of the band is provided for the described engaging of the longitudinal edges of the belt in the apertures of the fasteners. This supports the described deformation of the conveyor band belt so that the belt deforms and engages as desired. On the other hand, the rims and the grooves take care of the orientation of the belt and ensure the support of the joined belt.

The details, further characteristics and other advantages of the invention proceed from the following description of a form of execution in accordance with the figures in the diagrams.

BRIEF DESCRIPTION OF THE PREFERRED EMBODIMENTS

Figure 1:
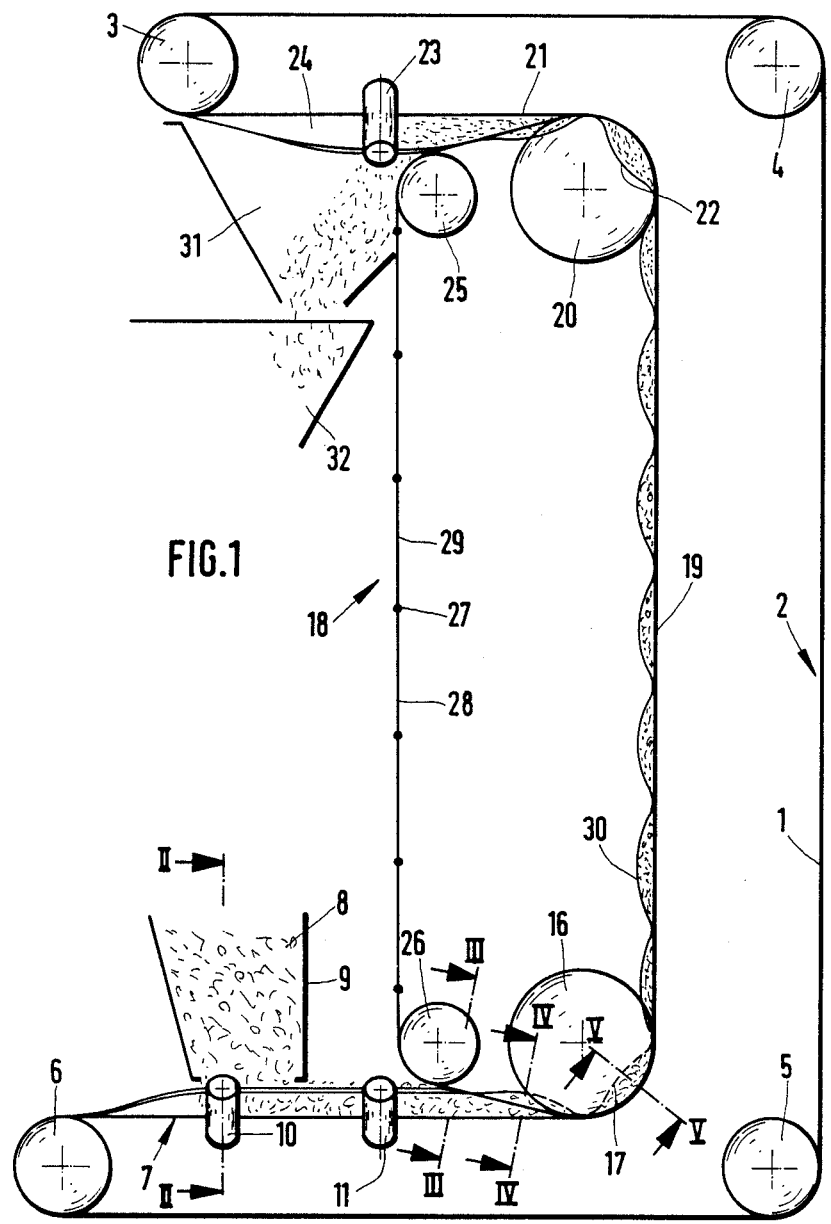
FIG. 1 is a schematic of a double belt band conveyor device, in accordance with the invention, in lateral view.
Figure 2:
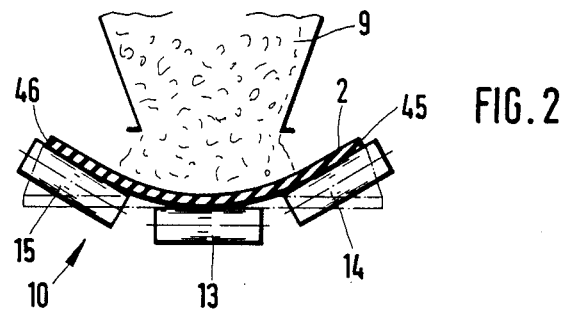
FIG. 2 is a sectional view taken along the line II—II of FIG. 1.

According to the representation of FIG. 1, a conveyor band is placed along a U-shaped conveyor extension. The conveyor band belt 2 thereby traverses the lower seam 1, beginning from the upper loop 3, over a bearing roller 4 and a lower guide roller 5, up to the lower loop 6. The conveying seam 7 connects with the lower loop 6. The loading takes place on a band feeder 9 which connects directly with the loop 6. The material being conveyed consists, in accordance with the form of execution depicted for purposes of illustration, of concrete 8. The feeding requires two trough roller assemblies 10 and 11 of which the trough roller assembly 10 is shown in FIG. 2. Such a trough roller assembly contains a horizontal band bearing roller 13 and two band bearing rollers 14 and 15 which are positioned at an angle. The supporting belt 2 of the upper seam is depressed from the action of the material being conveyed 8, and is thereby deformed into a roughly curved shape.

A lower band guiding cylinder 16 connects with the last trough roller assembly 11 which cylinder has recessions for accommodating buckled areas 17 of a covering band belt 18. The band guiding cylinder 16 deflects the upper seam 7 of the conveying band belt 2 into the vertical so that this can overcome a steep segment 19. An upper band guide cylinder 20 moves the material being conveyed 2 into a horizontal segment 21 and is, like the lower band guide cylinder 16, provided with recesses 22 for accommodating the buckled areas 17 of the covering band belt. A trough roller assembly 23 is connected with the conveyor band guide cylinder 20 on which assembly, the belt 2, because of its prestressing, is again depressed as shown at point 24. The belt 2 is flattened on the guide cylinders 3 to 6, as well as on the casings of the cylinders 16 and 20.

The covering band 18 has two guide cylinders of its own 25 and 26. These, together with the guide cylinder 16 and 20, guide the covering band belt 29 on its continuous circulation. The covering band belt has traction reinforcements, schematically indicated by 28, which cooperate with bendresistant lateral reinforcements 27. Between the reinforcements, the belt forms bucklings, as schematically indicated by 17. The bucklings 17 cooperate with the flat belt 2 of the conveyor band and form the stated conveyor spaces 30. The conveyor spaces 17 are sealed against one another at the longitudinal edges of the band and in the area of the lateral reinforcements 27.

Behind the band bearing roller 25 of the covering band belt 29, the dumping material lies in a feed hopper 31 from which the concrete, which forms the material being conveyed, as shown at 32, is removed.

Figure 3:
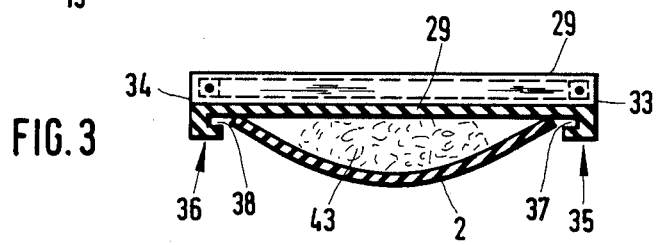
FIG. 3 is a sectional view taken along the line III—III of FIG. 1.
Figure 4:
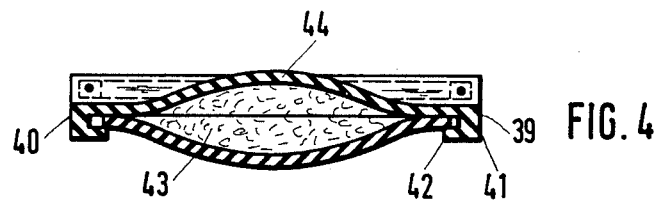
FIG. 4 is a sectional view taken along the line IV—IV of FIG. 1.
Figure 5:
FIG. 5 is a sectional view taken along the line V—V of FIG. 1.

As is evident from the representation in FIG. 3, the covering band belt 29 has, on both longitudinal edges 33,34, fasteners 35,36 protruding outwardly. The apertures 37,38 oppose one another. According to the depicted form of execution, the fasteners 35,36 are combined at each belt edge 33,34 with strips 39,40. That means that the fasteners of each longitudinal edge of the band 33,34 form a construction unit with the strips 30,40. These strips have an angular profile, by means of which a vertical blade 41 can be distinguished from a horizontal blade 42. The vertical blade runs orthogonally to the flat belt 29, while the connecting blade 42 is positioned in parallel to the flat belt 29.

In the form of execution in accordance with FIG. 1, the covering band belt 29 is controlled on the conveyor band belt 2 with the help of the band guide cylinder 26; this covering band belt has first been loaded with the material being conveyed 8 by means of the feeder 9. Finally, the conveyor band belt 29, in accordance with the depiction of FIG. 3, is directly supported with the depressed conveyor band belt 2 so that the inclusion of the small piles of material to be conveyed 43, which are located in the conveyor spaces 30 stated, begins. At the same time, the conveyor band belt 2 begins to flatten increasingly; this is positioned on the belt on the guide cylinder 16. The flattening is further carried on at the point depicted through the section IV—IV. Under the influence of the forces transferred from the pile of material 43, a buckling 44 of the covering band belt arises which finally, during the complete flattening, enlarges to the point of completion of the buckling 17.

During the movement of the conveyor band belt from the last trough roller assembly 11, the longitudinal edges 45,46 of the material conveyed 2 first approach the fasteners 35,36, as can be seen in FIG. 3. During the continuing flattening of the conveyor belt 2, the longitudinal edges 45,46 finally engage the fasteners where they are held stationary by means of force locking.

On the other hand, the reverse process is carried out with the trough roller assembly 23 on the upper guide cylinder 20. At this point, the running of the material to be conveyed 2 on the trough roller assembly 23 leads to a renewed depression of the material conveyed 2, corresponding to the representation on FIG. 2, and thereby to the disengaging of the longitudinal edges 45,46 from the engagement of the fasteners 35,36.

By means of the processes described, the belt edges are pressed on one another and held together at the steep segment by means of reciprocal cohesion of the belts 2 and 29.

Figure 6:
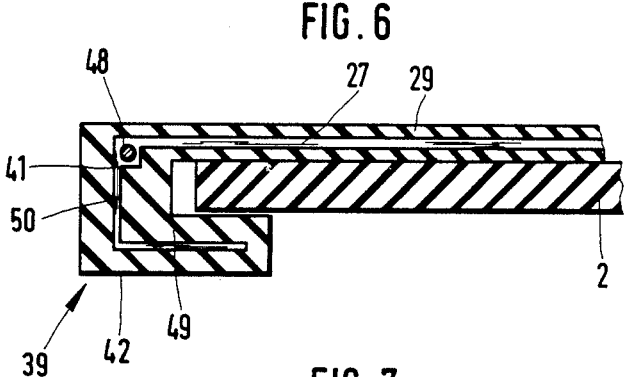
FIG. 6 is a schematic in open depiction of the left longitudinal edge of the band in contact with the fastener strip of the covering band belt, whereby the diagram depicts a cross-section.

In the form of execution in accordance with FIG. 6, the lateral reinforcements 27 are installed in the belt 29, and are bent on their ends which support recesses for form locking with the traction reinforcements which are positioned in pairs and which run in parallel, as is depicted at 48 in FIG. 6. The bends have a horizontal blade 49 which corresponds to the horizontal blade 42 of the strip. This horizontal blade 49 forms a construction unit with a vertical blade 50 which corresponds to it. The clamping force of the strip 39 and 40 is considerably reinforced by the angular profile.

Figure 7:
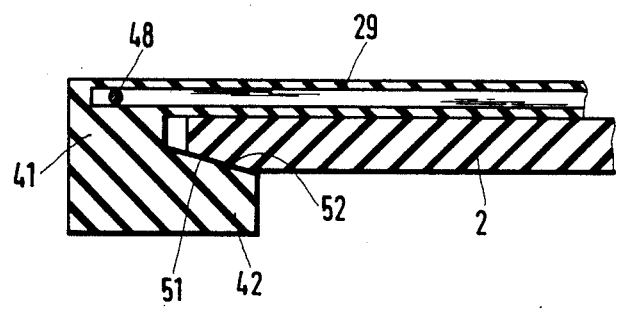
FIG. 7 is a view similar to FIG. 6 showing a modified form of execution of the invention.

On the other hand, the form of execution, in accordance with FIG. 7, dispenses with the extended ends of the lateral reinforcement 29, although, however, by means of a rising inclined surface 51 of the horizontal fastener blade 42 and a corresponding profile surface 52 on the conveying band belt 2, the clamping force is reinforced, whereby the engaging is facilitated at the same time with the aid of the guide by means of the sloping surfaces 51 and 52.

Figure 8:
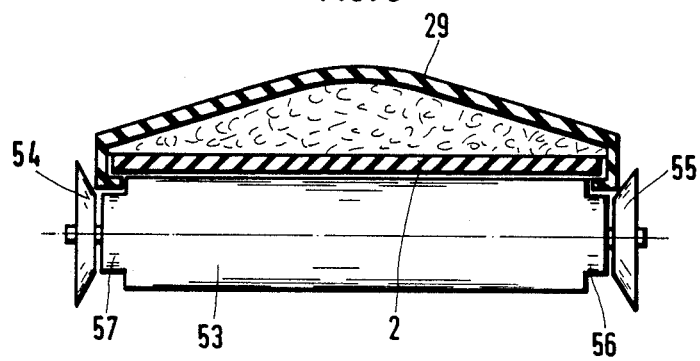
FIG. 8 is a depiction of a band bearing roller and the flattening of the conveyor band belt, showing a modified form of execution of the device in accordance with FIG. 1.

FIG. 8 depicts, for the described flattening of the conveyor belt 2, a bearing roller 53 which is provided adjacent the roller 16 and which includes rims 54,55. The rims insure that the belt 29 of the covering band is aligned on the conveyor band belt 2. Grooves 56,57 for accommodating the fasteners are provided on the ends of the straight band bearing rollers 53.

What is claimed is:

1. In a double-belt conveyor having a steep conveyor track and a continuously revolving conveyor band, which includes a conveyor belt which is supported on a band feeder and on trough roller assemblies, and is supported flatly on the steep conveyor track and a continuously revolving covering belt which is buckled in the conveyor seam for the formation of closed conveyor spaces, and having traction reinforcements positioned externally of the conveyor belt, and shear-resistant lateral reinforcements acting in cooperation with the traction reinforcements and in which the longitudinal edges of the belts are pressed on one another and the long edges of the belts are held together, the improvement comprising:

fasteners (35,36) which are disposed on and project externally of both longitudinal edges (33,34) of the covering belt (29) and are provided with opposing apertures (37,38) for receipt of the longitudinal edges (45,46) of the conveyor belt (2), during the running of the trough roller assemblies (10,11), the conveyor belt being buckled along its longitudinal center line and longitudinal edges of the belts approaching or moving away from each other during the running of the conveyor belt (2) over the trough roller assemblies; at least one band guide roller (53) having fastener engaging means on its opposed ends installed in the conveyor direction downstream of the last trough roller assembly (11) of the band feeder (9); said band guide roller lying flatly beneath the conveyor belt (2) whereby the conveyor belt (2) is flattened to engage the fasteners (35,36) with its longitudinal edges (45,46) to press the belt edges of the conveyor and covering belts (2,29) on one another; said fasteners (35,36) of each edge of the covering belt being included in a strip (39,40) which has an angular section (41,42) with a vertical blade (41) vertical to the plane of the covering belt (29), and another blade (42) parallel to the plane of the covering belt (29).

2. A double-belt conveyor in accordance with claim 1 wherein lateral reinforcements (27) are carried by said strip (39,40); and traction reinforcements (48) are carried by said lateral reinforcements.

3. A double-belt conveyor in accordance with claim 1 wherein lateral reinforcements (27) are provided on the covering belt (29); and traction reinforcements (48) are carried by said lateral reinforcements.

4. A double-belt conveyor in accordance with claim 1 wherein the longitudinal edges of the conveyor belt (2) are bevelled to form a profile surface (52); and said vertical blade (41) is correspondingly bevelled to form a profile surface (51).

5. A double-belt conveyor in accordance with claim 3 wherein the longitudinal edges of the conveyor belt (2) are bevelled to form a profile surface (52); and said vertical blade (41) is correspondingly bevelled to form a profile surface (51).

6. A double-belt conveyor in accordance with claim 1 wherein said fastener engaging means of said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

7. A double-belt conveyor in accordance with claim 3 wherein said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

8. A double-belt conveyor in accordance with claim 4 wherein said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

9. A double-belt conveyor in accordance with claim 5 wherein said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

10. In a double-belt conveyor having a steep conveyor track and a continuously revolving conveyor band, which includes a conveyor belt which is supported on a band feeder and on trough roller assemblies, and is supported flatly on the steep conveyor track and a continuously revolving covering belt which is buckled in the conveyor seam for the formation of closed conveyor spaces, and having traction reinforcements positioned externally of the conveyor belt, and shear-resistant lateral reinforcements acting in cooperation with the traction reinforcements and in which the longitudinal edges of the belts are pressed on one another and the long edges of the belts are held together, the improvement comprising:

fasteners (35,36) which are disposed on and project externally of both longitudinal edges (33,34) of the covering belt (29) and are provided with opposing apertures (37,38) for receipt of the longitudinal edges (45,46) of the conveyor belt (2), during the running of the trough roller assemblies (10,11), the longitudinal edges of the belts approaching or moving away from each other during the running of the conveyor belt (2) over the trough roller assemblies; at least one band guide roller (53) installed in the conveyor direction downstream of the last trough roller assembly (11) of the band feeder (9); said band guide roller lying flatly beneath the conveyor belt (2) whereby the conveyor belt (2) engages the fasteners (35,36) with its longitudinal edges (45,46) to press the belt edges of the conveyor and covering belts (2,29) on one another, said fasteners (35,36) of each edge of the covering belt being included in a strip (39,40) which has an angular section (41,42) with a vertical blade (41) vertical to the plane of the covering belt (29), and another blade (42) parallel to the plane of the covering belt 29); said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

11. In a double-belt conveyor having a steep conveyor track and a continuously revolving conveyor band, which includes a conveyor belt which is supported on a band feeder and on trough roller assemblies, and is supported flatly on the steep conveyor track and a continuously revolving covering belt which is buckled in the conveyor seam for the formation of closed conveyor spaces, and having traction reinforcements positioned externally of the conveyor belt, and shear-resistant lateral reinforcements acting in cooperation with the traction reinforcements and in which the longitudinal edges of the belts are pressed on one another and the long edges of the belts are held together, the improvement comprising:

fasteners (35,36) which are disposed on and project externally of both longitudinal edges (33,34) of the covering belt (29) and are provided with opposing apertures (37,38) for receipt of the longitudinal edges (45,46) of the conveyor belt (2), during the running of the trough roller assemblies (10,11), the longitudinal edges of the belts approaching or moving away from each other during the running of the conveyor belt (2) over the trough roller assemblies; at least one band guide roller (53) installed in the conveyor direction downstream of the last trough roller assembly (11) of the band feeder (9); said band guide roller lying flatly beneath the conveyor belt (2) whereby the conveyor belt (2) engages the fasteners (35,36) with its longitudinal edges (45,46) to press the belt edges of the conveyor and covering belts (2,29) on one another; said fasteners (35,36) of each edge of the covering belt being included in a strip (39,40) which has an angular section (41,42) with a vertical blade (41) vertical to the plane of the covering belt (29), and another blade (42) parallel to the plane of the covering belt (29); lateral reinforcements (27) are provided on the covering belt (29); traction reinforcements (48) are carried by said lateral reinforcements, said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

12. In a double-belt conveyor having a steep conveyor track and a continuously revolving conveyor band, which includes a conveyor belt which is supported on a band feeder and on trough roller assemblies, and is supported flatly on the steep conveyor track and a continuously revolving covering belt which is buckled in the conveyor seam for the formation of closed conveyor spaces, and having traction reinforcements positioned externally of the conveyor belt, and shear-resistant lateral reinforcements acting in cooperation with the traction reinforcements and in which the longitudinal edges of the belts are pressed on one another and the long edges of the belts are held together, the improvement comprising:

fasteners (35,36) which are disposed on and project externally of both longitudinal edges (33,34) of the covering belt (29) and are provided with opposing apertures (37,38) for receipt of the longitudinal edges (45,46) of the conveyor belt (2), during the running of the trough roller assemblies (10,11), the longitudinal edges of the belts approaching or moving away from each other during the running of the conveyor belt (2) over the trough roller assemblies; at least one band guide roller (53) installed in the conveyor direction downstream of the last trough roller assembly (11) of the band feeder (9); said band guide roller lying flatly beneath the conveyor belt (2) whereby the conveyor belt (2) engages the fasteners (35,36) with its longitudinal edges (45,46) to press the belt edges of the conveyor and covering belts (2,29) on one another; said fasteners (35,36) of each edge of the covering belt being included in a strip (39,40) which has an angular section (41,42) with a vertical blade (41) vertical to the plane of the covering belt (29), and another blade (42) parallel to the plane of the covering belt (29); the longitudinal edges of the conveyor belt (2) are bevelled to form a profile surface (52); and said vertical blade (41) is correspondingly bevelled to form a profile surface (51); said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

13. In a double-belt conveyor having a steep conveyor track and a continuously revolving conveyor band, which includes a conveyor belt which is supported on a band feeder and on trough roller assemblies, and is supported flatly on the steep conveyor track and a continuously revolving covering belt which is buckled in the conveyor seam for the formation of closed conveyor spaces, and having traction reinforcements positioned externally of the conveyor belt, and shear-resistant lateral reinforcements acting in cooperation with the traction reinforcements and in which the longitudinal edges of the belts are pressed on one another and the long edges of the belts are held together, the improvement comprising:

fasteners (35,36) which are disposed on and project externally of both longitudinal edges (33,34) of the covering belt (29) and are provided with opposing apertures (37,38) for receipt of the longitudinal edges (45,46) of the conveyor belt (2), during the running of the trough roller assemblies (10,11), the longitudinal edges of the belts approaching or moving away from each other during the running of the conveyor belt (2) over the trough roller assemblies; at least one band guide roller (53) installed in the conveyor direction downstream of the last trough roller assembly (11) of the band feeder (9); said band guide roller lying flatly beneath the conveyor belt (2) whereby the conveyor belt (2) engages the fasteners (35,36) with its longitudinal edges (45,46) to press the belt edges of the conveyor and covering belts (2,29) on one another; said fasteners (35,36) of each edge of the covering belt being included in a strip (39,40) which has an angular section (41,42) with a vertical blade (41) vertical to the plane of the covering belt (29), and another blade (42) parallel to the plane of the covering belt (29); lateral reinforcements (27) are provided on the covering belt (29); and traction reinforcements (48) are carried by said lateral reinforcements; the longitudinal edges of the conveyor belt (2) are bevelled to form a profile surface (52); and said vertical blade (41) is correspondingly bevelled to form a profile surface (51); said band guide roller (53) which serves to flatten the conveyor belt (2) is provided on both ends with rims (54,55) and grooves (56,57) for accommodating the fasteners (35,36) while said fasteners engage the longitudinal edges of said conveyor belt.

* * * * *